(No Model.)

G. A. BRICE.
FOUR WHEELED VEHICLE

No. 469,118. Patented Feb. 16, 1892.

WITNESSES:
A. Ruppert
G. M. Finley

INVENTOR:
George A. Brice
BY
[signature]
ATTORNEYS.

UNITED STATES PATENT OFFICE.

GEORGE ASA BRICE, OF TITUSVILLE, PENNSYLVANIA.

FOUR-WHEELED VEHICLE.

SPECIFICATION forming part of Letters Patent No. 469,118, dated February 16, 1892.

Application filed May 13, 1891. Serial No. 392,594. (No model.)

*To all whom it may concern:*

Be it known that I, GEORGE ASA BRICE, of Titusville, in the county of Crawford and State of Pennsylvania, have invented certain new and useful Improvements in Four-Wheeled Vehicles, of which the following is a specification, reference being had to the accompanying drawings and to the letters of reference marked thereon.

My invention has for its object the improvement of the springs and gear of vehicles of the class named, so that the fastenings shall not be subjected to strain and the whole structure shall be simple and durable and possess easy-riding qualities; and it consists in the novel construction of parts and their combinations, as will hereinafter appear, and be specifically pointed out in the claim.

Figure 1:
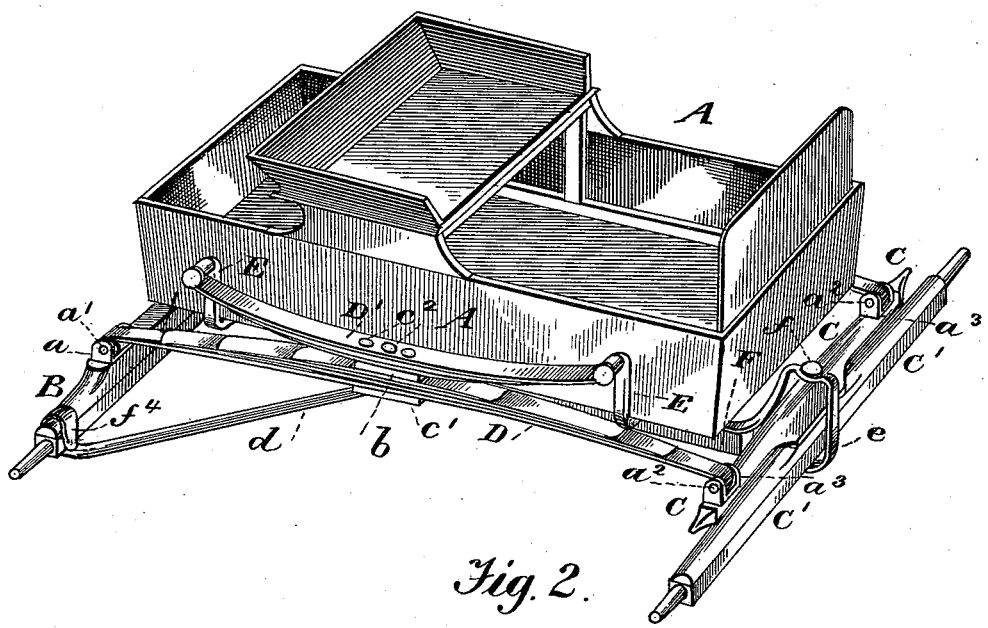
Figure 2:
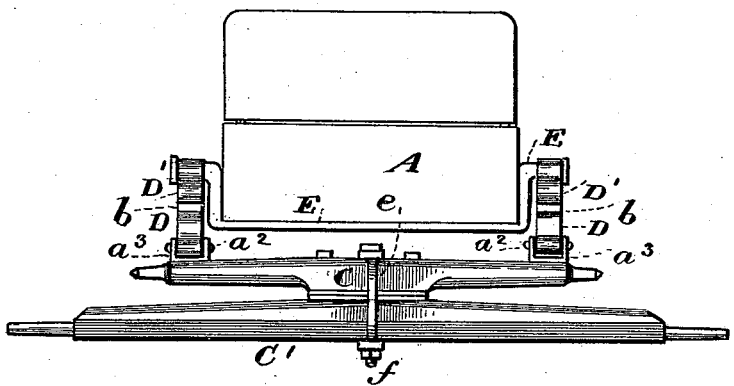
Figure 3:
Figure 4:

In the accompanying drawings, Figure 1 is a perspective view of a vehicle containing my improvement. Fig. 2 is a front end view of the vehicle. Figs. 3 and 4 are details.

Similar letters of reference indicate similar parts in the respective figures.

A is the body of the vehicle; B, the hind axle; C, the front spring-bar or head-block, and C' the front axle.

D D represent two leaf-springs, one being on each side of the body, each of said springs being secured at one end to the hind axle B in lugs $a$ by means of pins or bolts $a'$, the attachment being such as to hold the spring pivotally in the ears, but without longitudinal motion. The opposite end of each spring D is similarly attached by pins or bolts $a^2$ to the spring-bar or head-block C, which is provided with lugs $a^3$, similar to those $a$ of the hind axle. The springs D are made of any number of leaves to give the required strength thereto, and, except as to the pivotal movement on the pins or bolts at their respective ends, are incapable of movement with relation to the hind axle and spring-bar or head-block, in this respect differing from spring constructions in other vehicles of this class known to me. At or near the center of each spring D is placed a block of wood or metal $b$, which serves as the support to the center of a shorter leaf-spring D', the outer ends of said springs being secured, so as to be incapable of longitudinal movement, to bent bars E, secured to the bottom of the body A, as shown. The bent bars E extend upward at each of their ends above the floor of the body A, so as to bring the ends of the springs D' considerably above it. The connection between the springs D and D' is formed by means of the block $b$, the under metallic plate $c'$, and bolts $c^2$, the latter passing through the whole. Clips are thus dispensed with, whether intended to assist in the union of the springs or to stiffen or limber them up by adjustment toward or away from the point of union.

The hind axle B and the spring-bar or head-block C are connected by means of the reach F, which is braced to the hind axle by rods or bars $d$. A suitable keeper $e$ forms the forward end of the reach and serves, in connection with the king-bolt $f$, to make the pivotal connection between the spring-bar or head-block C and front axle C'.

Fig. 3 shows the connection between the rear end of the reach and the hind axle and the front end of the reach and the spring-bar or head-block and front axle. The rear end of the reach F is attached to the hind axle B by means of a strap $f'$, let into the under side of the axle and united to it by means of a clip $f^2$, having nuts $f^3$. The rods or bars $d$ are also secured to the hind axle by similar clips $f^4$.

The whole construction constituting my invention is such as to form a spring-gear having the advantages of great resiliency, strength, and durability, and one which gives the vehicle easy-riding qualities not possessed, so far as my information goes, by any structure designed for the same purpose. The straining of the fastenings or the gear of the vehicle is avoided and no rattling produced.

It is necessary to my invention that the springs shall have given to them as little curvature as possible. In practice when the proper load is upon the wagon the two springs occupy lines substantially parallel to each other. The springs being incapable of end movement at their points of connection, the thrust is necessarily against the hind axle and the spring-bar and compensated for in the latter; but the end movement consequent upon the lengthening of the springs when loaded is so slight as to be imperceptible.

Having described my invention, I claim—

In a four-wheeled vehicle, the combination, with the hind axle, the spring-bar, and a rigid reach, of the leaf-springs D, each secured at its ends to said axle and spring-bar, the leaf-springs D', the body A, and the bent bars E, extended upward at each end above the floor of the body, each of said springs D' being secured to said bent bars E, said springs D and D' being incapable of end movement at their points of connection, the lengthening of the springs when loaded being compensated for in the spring-bar, substantially as set forth.

In testimony whereof I hereto set my hand and seal.

GEORGE ASA BRICE. [L. S.]

Witnesses:
 H. DOUBLE,
 W. E. LEE.